United States Patent
Osaki et al.

(10) Patent No.: US 10,202,553 B2
(45) Date of Patent: Feb. 12, 2019

(54) HYDROPROCESSING CATALYST FOR HEAVY HYDROCARBON OIL, METHOD FOR MANUFACTURING HYDROPROCESSING CATALYST FOR HEAVY HYDROCARBON OIL, AND HYDROPROCESSING METHOD FOR HEAVY HYDROCARBON OIL

(71) Applicant: Cosmo Oil Co., Ltd., Tokyo (JP)

(72) Inventors: Takayuki Osaki, Tokyo (JP); Nobumasa Nakajima, Satte (JP)

(73) Assignee: COSMO OIL CO., LTD., Tokyo (JP)

(*) Notice: Subject to any disclaimer, the term of this patent is extended or adjusted under 35 U.S.C. 154(b) by 239 days.

(21) Appl. No.: 15/021,960

(22) PCT Filed: Sep. 25, 2014

(86) PCT No.: PCT/JP2014/075392
§ 371 (c)(1),
(2) Date: Mar. 15, 2016

(87) PCT Pub. No.: WO2015/053087
PCT Pub. Date: Apr. 16, 2015

(65) Prior Publication Data
US 2016/0230102 A1    Aug. 11, 2016

(30) Foreign Application Priority Data
Oct. 11, 2013 (JP) .................................. 2013-213769

(51) Int. Cl.
| | | |
|---|---|---|
| *B01J 21/12* | (2006.01) | |
| *B01J 23/89* | (2006.01) | |
| *B01J 27/182* | (2006.01) | |
| *C10G 65/04* | (2006.01) | |
| *C10G 45/08* | (2006.01) | |
| *B01J 27/19* | (2006.01) | |
| *B01J 37/28* | (2006.01) | |
| *B01J 23/883* | (2006.01) | |
| *B01J 35/10* | (2006.01) | |
| *B01J 37/02* | (2006.01) | |
| *B01J 37/00* | (2006.01) | |

(52) U.S. Cl.
CPC ............ *C10G 65/04* (2013.01); *B01J 23/883* (2013.01); *B01J 27/19* (2013.01); *B01J 35/1014* (2013.01); *B01J 35/1019* (2013.01); *B01J 35/1042* (2013.01); *B01J 35/1061* (2013.01); *B01J 37/0009* (2013.01); *B01J 37/0201* (2013.01); *B01J 37/0215* (2013.01); *B01J 37/28* (2013.01); *C10G 45/08* (2013.01)

(58) Field of Classification Search
CPC . B01J 21/12; B01J 23/89; B01J 23/883; B01J 27/182; B01J 27/19; B01J 35/1014; B01J 35/1019; B01J 35/1042; B01J 35/1061; B01J 37/0009; B01J 37/0201; B01J 37/0215; B01J 37/28; C10G 65/04; C10G 45/08

USPC ........... 502/210, 213, 313, 314–315; 208/46, 208/114, 118, 120.3, 120.35, 136, 137
See application file for complete search history.

(56) References Cited

U.S. PATENT DOCUMENTS

| | | | | |
|---|---|---|---|---|
| 5,686,374 | A * | 11/1997 | Nakaoka | B01J 29/084 502/307 |
| 6,013,598 | A * | 1/2000 | Lapinski | B01J 23/882 502/305 |
| 6,267,874 | B1 * | 7/2001 | Iijima | B01J 21/12 208/111.3 |
| 6,716,525 | B1 * | 4/2004 | Yadav | A61L 27/06 428/402 |
| 2003/0173256 | A1 | 9/2003 | Fujikawa et al. | |
| 2004/0026298 | A1 * | 2/2004 | Ellis | B01J 35/0006 208/210 |
| 2004/0050754 | A1 * | 3/2004 | Abe | B01J 23/85 208/216 PP |
| 2004/0238411 | A1 * | 12/2004 | Abe | B01J 23/85 208/216 PP |
| 2007/0114156 | A1 * | 5/2007 | Greeley | C10G 65/04 208/208 R |
| 2008/0017551 | A1 | 1/2008 | Kiriyama et al. | |
| 2012/0116138 | A1 * | 5/2012 | Goodall | C10G 45/08 585/357 |
| 2016/0220985 | A1 * | 8/2016 | Osaki | B01J 37/04 |
| 2016/0228858 | A1 * | 8/2016 | Osaki | B01J 27/19 |
| 2017/0009143 | A1 * | 1/2017 | Urade | C10G 45/44 |

FOREIGN PATENT DOCUMENTS

| | | | | |
|---|---|---|---|---|
| CN | 1756831 | A | 4/2006 | |
| CN | 1938087 | A | 3/2007 | |
| EP | 1600491 | A1 | 11/2005 | |
| EP | 3050624 | | 8/2016 | |
| GB | 1510155 | A * | 5/1978 | .............. B01J 27/16 |
| JP | H07-194979 | * | 8/1995 | .............. B01J 23/85 |
| JP | H07194979 | A | 8/1995 | |
| JP | 2000135438 | A | 5/2000 | |
| JP | 2000313891 | A | 11/2000 | |
| JP | 2001316679 | A | 11/2001 | |

(Continued)

OTHER PUBLICATIONS

Supplemental Search Report dated May 29, 2017 in EP Application No. 14851746.9.

(Continued)

*Primary Examiner* — Patricia L. Hailey
(74) *Attorney, Agent, or Firm* — Panitch Schwarze Belisario & Nadel LLP

(57) ABSTRACT

The hydroprocessing catalyst for a heavy hydrocarbon oil, includes, as a carrier, a phosphorus-silica-containing alumina carrier containing 0.1% by mass to 4% by mass of phosphorus in terms of oxide based on the carrier, and 0.1% by mass to 1.5% by mass of silica based on the carrier, the carrier supporting 8% by mass to 20% by mass of at least one selected from metals in Group 6 of the periodic table in terms of oxide based on the catalyst and 2% by mass to 6% by mass of at least one selected from metals in Groups 8 to 10 of the periodic table in terms of oxide based on the catalyst.

6 Claims, No Drawings

(56) References Cited

FOREIGN PATENT DOCUMENTS

| | | |
|---|---|---|
| JP | 2003103173 A | 4/2003 |
| JP | 2004263117 A | 9/2004 |
| JP | 2005169232 A | 6/2005 |
| JP | 2005305418 A | 11/2005 |
| JP | 2005314657 A | 11/2005 |
| JP | 2008143917 A | 6/2008 |
| JP | 2010248476 A | 11/2010 |
| JP | 2012521292 A | 9/2012 |
| WO | 2010111168 A2 | 9/2010 |

OTHER PUBLICATIONS

International Search Report dated Jan. 6, 2015 in International Application No. PCT/JP2014/075392.
Office Action dated Jan. 26, 2017 in CN Application No. 201480053498.6.
Office Action dated Sep. 11, 2018 in JP Application No. 2015-541512.

\* cited by examiner

HYDROPROCESSING CATALYST FOR HEAVY HYDROCARBON OIL, METHOD FOR MANUFACTURING HYDROPROCESSING CATALYST FOR HEAVY HYDROCARBON OIL, AND HYDROPROCESSING METHOD FOR HEAVY HYDROCARBON OIL

CROSS-REFERENCE TO RELATED APPLICATION

This application is a Section 371 of International Application No. PCT/JP2014/075392, filed Sep. 25, 2014, which was published in the Japanese language on Apr. 16, 2015, under International Publication No. WO 2015/053087 A1, and the disclosure of which is incorporated herein by reference.

TECHNICAL FIELD

The present invention relates to a hydroprocessing catalyst for heavy hydrocarbon oil used for hydrodesulfurization of atmospheric distillation residual oil (hereinafter, also referred to as "AR") and vacuum distillation residual oil (hereinafter, also referred to as "VR") using a residue desulfurization process and capable of improving the storage stability of a hydroprocessed oil obtained by hydrogenating heavy hydrocarbon oils of atmospheric distillation residual oil and vacuum distillation residual oil, a method for manufacturing the hydroprocessing catalyst, and a hydroprocessing method for heavy hydrocarbon oil using the hydroprocessing catalyst.

Priority is claimed on Japanese Patent Application No. 2013-213769, filed Oct. 11, 2013, the content of which is incorporated herein by reference.

BACKGORUND ART

Heavy hydrocarbon oils such as AR obtained by treating crude oil using an atmospheric distillation unit and VR obtained by further treating AR using a vacuum distillation unit contain a large amount of sulfur compounds. When these heavy hydrocarbon oils are used as a fuel without desulfurization, a large amount of sulfur compounds (SOx) are discharged into the air and the discharged sulfur causes environmental damage. Therefore, it is necessary to reduce the amount of sulfur compounds in the heavy hydrocarbon oils.

As a result, improvements in activity and life of a hydroprocessing catalyst have been studied intensively for the purpose of reducing the amount of sulfur compounds in heavy hydrocarbon oil. For example, it has been disclosed that desulfurization performance is improved by incorporating phosphorus into an alumina carrier in an alumina-based hydroprocessing catalyst (for example, refer to PTLs 1 and 2).

On the other hand, heavy hydrocarbon oil is required to have improved storage stability. A hydroprocessed heavy hydrocarbon oil is stored under heating to maintain fluidity until shipping in consideration of workability at the time of shipping. In addition, the oil may be stored for a long period of time after the oil is shipped as a product before use. Therefore, depending on a thermal history and the atmosphere at the time of storage, sediment is produced while the oil is stored and this sediment may cause plugging of a filter or damage to a pump.

There are several reasons why sediment is produced, one of which to be considered is the stability of asphaltene contained in heavy hydrocarbon oil. When asphaltene is surrounded by resin, the asphaltene is dispersed in heavy hydrocarbon oil without producing sediment. However, when resin is dissociated from asphaltene by hydrogenation and the balance between the asphaltene and the resin collapses, the asphaltene easily appears as sediment.

CITATION LIST

Patent Literature

[PTL 1] Japanese Unexamined Patent Application, First Publication No. 2000-135438
[PTL 2] Japanese Unexamined Patent Application, First Publication No. 2005-169232

SUMMARY OF INVENTION

Technical Problem

An object of the present invention is to provide a hydroprocessing catalyst capable of improving the storage stability of hydroprocessed heavy hydrocarbon oil without reducing desulfurization activity or demetallization activity, a method for manufacturing the hydroprocessing catalyst, and a hydroprocessing method for heavy hydrocarbon oil using the hydroprocessing catalyst.

Solution to Problem

In order to accomplish the above object, the present inventors have conducted extensive investigation and found, as a result, that in hydrogenation for heavy hydrocarbon oil, by using a hydroprocessing catalyst which allows a hydrogenation-active component to be supported on a phosphorus-silica-containing alumina carrier respectively containing specific amounts of phosphorus and silica, a hydroprocessed oil in which the amount of potential total sediment is reduced can be obtained and thus the present invention has been completed.

That is, the present invention relates to a hydroprocessing catalyst for heavy hydrocarbon oil, a method for manufacturing a hydroprocessing catalyst for heavy hydrocarbon oil, and a hydroprocessing method for heavy hydrocarbon oil below.

[1] A hydroprocessing catalyst for heavy hydrocarbon oil using, as a carrier, phosphorous-silica-containing alumina that contains 0.1% by mass to 4% by mass of phosphorous in terms of oxide based on the carrier and 0.1% by mass to 1.5% by mass of silica based on the carrier, and supporting, on the carrier, 8% by mass to 20% by mass of at least one selected from metals in Group 6 of the periodic table in terms of oxide based on the catalyst and 2% by mass to 6% by mass of at least one selected from metals in Groups 8 to 10 of the periodic table in terms of oxide based on the catalyst.

[2] A method for manufacturing a hydroprocessing catalyst for heavy hydrocarbon oil, including:
a step of preparing an alumina gel;
a step of kneading the alumina gel with a phosphorous compound and silica such that 0.1% by mass to 4% by mass of phosphorous in terms of oxide based on a carrier, and 0.1% by mass to 1.5% by mass of silica based on a carrier is incorporated;

a step of obtaining a phosphorous-silica-containing alumina carrier by molding the obtained kneaded mixture, and drying and calcining a molded product; and a step of supporting, on the phosphorous-silica-containing alumina carrier, at least one selected from metals in Group 6 of the periodic table and at least one selected from metals in Groups 8 to 10 of the periodic table such that 8% by mass to 20% by mass of at least one selected from metals in Group 6 of the periodic table in terms of oxide based on a catalyst and 2% by mass to 6% by mass of at least one selected from metals in Groups 8 to 10 of the periodic table in terms of oxide based on a catalyst are incorporated.

[3] A hydroprocessing method for heavy hydrocarbon oil, including performing hydroprocessing by sequentially bringing heavy hydrocarbon oil into contact with a front stage catalyst, a middle stage catalyst, and a rear stage catalyst at a hydrogen partial pressure of 3 MPa to 20 MPa, a hydrogen/oil ratio of 400 m$^3$/m$^3$ to 3,000 m$^3$/m$^3$, a temperature of 300° C. to 420° C., and a liquid space velocity of 0.1 h$^{-1}$ to 3 h$^{-1}$, in which (a) a catalyst, in which an inorganic oxide carrier containing 1% by mass to 15% by mass of zinc oxide based on the carrier contains 2% by mass to 15% by mass of at least one selected from metals in Group 6 of the periodic table and 0.001% by mass to 5% by mass of at least one selected from metals in Groups 8 to 10 of the periodic table in terms of oxides based on the catalyst, and the specific surface area is 70 m$^2$/g to 150 m$^2$/g, the pore volume is 0.6 mL/g to 1 mL/g, the average pore diameter is 15 nm to 35 nm, and a ratio of the total volume of pores having a pore diameter in a range of ±2.0 nm from the average pore diameter to the total pore volume is 15% to 50%, is used in an amount of 10% by volume to 50% by volume with respect to the entire catalyst, (b) as the middle stage catalyst, a hydroprocessing catalyst, in which a hydrogenation-active component is supported on a silica-containing porous alumina carrier containing 0.1% by mass to 1.5% by mass of silica based on the carrier, the total pore volume is 0.55 mL/g to 0.75 mL/g, and the following conditions (1) to (5) relating to a pore distribution are satisfied:

(1) the total volume of pores having a pore diameter of 5 nm to 10 nm is 30% to 45% of the total volume of pores having a pore diameter of 3 nm to 30 nm;

(2) the total volume of pores having a pore diameter of 10 nm to 15 nm is 50% to 65% of the total volume of pores having a pore diameter of 3 nm to 30 nm;

(3) the total volume of pores having a pore diameter of 30 nm or more is 3% or less of the total pore volume;

(4) the average pore diameter of pores having a pore diameter of 10 nm to 30 nm is 10.5 nm to 13 nm; and (5) the total volume of pores having a pore diameter in a range of ±1 nm from the average pore diameter is 25% or more of the total pore volume of pores having a pore diameter of 3 nm to 30 nm, is used in an amount of 10% by volume to 50% by volume with respect to the entire catalyst, and (c) as the rear stage catalyst, the hydroprocessing catalyst according to [1] or a hydroprocessing catalyst manufactured by the method according to [2] is used in an amount of 20% by volume to 70% by volume with respect to the entire catalyst.

Advantageous Effects of Invention

In the hydroprocessing catalyst according to the present invention, a hydrogenation-active component is supported on a phosphorus-silica-containing alumina carrier respectively containing specific amounts of phosphorus and silica, and the desulfurization activity for heavy hydrocarbon oil is excellent. Further, by carrying out hydrogenation using the hydroprocessing catalyst, a heavy hydrocarbon oil that does not easily produce sediment and has excellent storage stability can be obtained.

DESCRIPTION OF EMBODIMENTS

<Hydroprocessing Catalyst>

The hydroprocessing catalyst according to the present invention contains alumina as a carrier main component.

The alumina to be used may be any of various kinds of alumina including α-alumina, β-alumina, γ-alumina, and δ-alumina. However, an alumina which is porous and has a large specific surface area is preferable and among these various kinds of alumina, γ-alumina are suitable.

The purity of alumina suitably used as a carrier main component is preferably 98% by mass or higher and more preferably 99% by mass or higher.

Examples of impurities contained in alumina include $SO_4^{2-}$, $Cl^-$, $Fe_2O_3$, and $Na_2O$. The lower the content of these impurities, the more preferable the alumina is. The total amount of impurities is preferably 2% by mass or less and more preferably 1% by mass or less. The amount of each impurity is preferably as follows. The amount of $SO_4^{2-}$ is preferably 1.5% by mass or less, and the amount of $Cl^-$, $Fe_2O_3$, $Na_2O$ or the like is preferably 0.1% by mass or less.

The carrier of the hydroprocessing catalyst according to the present invention is a phosphorus-silica-containing alumina carrier obtained by further incorporating phosphorus and silica to an alumina carrier.

Phosphorus and silica are added as components which improve the quality of active sites to improve desulfurization activity and residual carbon-removing activity per amount of active metals and have a function of accurately forming an active metal-sulfur phase having high activity such as a NiMoS phase or a NiWS phase.

The amount of silica included in the phosphorus-silica-containing porous alumina carrier of the hydroprocessing catalyst according to the present invention is, based on the carrier, 0.1% by mass to 1.5% by mass and preferably 0.1% by mass to 1.2% by mass. When the silica content is 0.1% by mass or more, active sites by Group 6 metal and Group 8 to 10 metal are optimally formed and when the silica content is 1.5% by mass or less, a decomposition reaction is not easily accelerated by acid sites that are expressed by the addition of silica and thus sediment is not easily produced.

The phosphorus content in the carrier of the hydroprocessing catalyst according to the present invention is 0.1% by mass to 4% by mass and preferably 0.5% by mass to 2.5% by mass in terms of oxide based on the carrier. When the phosphorus content in the carrier is 0.1% by mass or more in terms of oxide based on the carrier, the degree of sulfurization of the metal in Group 6 of the periodic table can be sufficiently increased. When the phosphorus content is 4% by mass or less, a decrease in pore volume or specific surface area does not easily occur and the metal in Group 6 of the periodic table are appropriately dispersed and thus the effect of addition of phosphorus is sufficiently obtained.

In addition, in the hydroprocessing catalyst according to the present invention, the phosphorus content is preferably 0.08% by mass to 3.6% by mass in terms of oxide based on the catalyst.

As a raw material compound for phosphorus contained in the carrier of the hydroprocessing catalyst according to the present invention, various compounds can be used. Examples of phosphorus compounds include orthophosphoric acid, metaphosphoric acid, pyrophosphoric acid, triphosphates, and tetraphosphates. Among them, orthophosphoric acid is preferable.

In the present invention, regarding the phosphorus content, the term "in terms of oxide based on the carrier" refers to a ratio of a phosphorus oxide mass to the total mass obtained by calculating the total mass of all elements included in the carrier in terms of respective oxides. The phosphorus oxide mass is obtained in terms of diphosphorus pentoxide.

It is considered that addition of phosphorus and silica to the alumina carrier alleviates the interaction between the metal in Group 6 of the periodic table (hereinafter, also referred to as "Group 6 metal") and the metal in Groups 8 to 10 of the periodic table (hereinafter, also referred to as "Group 8 to 10 metal") and the carrier and makes the sulfurization of each of the Group 6 metal and the Group 8 to 10 metal easy. On the other hand, when the interaction between the Group 6 metal and the Group 8 to 10 metal and the carrier is too weak, aggregation of the active metals occurs and thus accurate control is required when phosphorus and silica are added.

In the hydroprocessing catalyst according to the present invention, it is considered that a structural configuration such as the number of laminated layers can be optimized while maintaining a high dispersion state of an active metal-sulfur phase such as a NiMoS phase or a NiWS phase by adding phosphorus and silica to the alumina carrier with accurate control.

In the present invention, the term of "metal in Group 6 of the periodic table" refers to a Group 6 metal in the long-periodic table and the term of "metal in Groups 8 to 10 of the periodic table" refers to a Group 8 to 10 metal in the long-periodic table.

In order to obtain the phosphorus-silica-containing alumina carrier used in the hydroprocessing catalyst according to the present invention, first, an alumina gel is prepared by a usual manner.

The raw material for alumina to be used may be any material as long as the materials contain aluminum. Aluminum salts such as aluminum sulfate and aluminum nitrate are preferable. These raw materials for alumina are usually used as an aqueous solution. Although the concentration is not particularly limited, the concentration is preferably 2% by mass to 50% by mass and more preferably 5% by mass to 40% by mass.

For preparing the alumina gel, for example, an aqueous sulfuric acid solution, sodium aluminate, and aluminum hydroxide are mixed in a stirring pot to prepare a slurry. The obtained slurry is dewatered by a revolving cylinder type continuous vacuum filter and the slurry is washed with purified water to obtain an alumina gel. Next, the obtained alumina gel is washed until $SO_4^{2-}$ or $Na^+$ is not detected in the filtrate. Then, the alumina gel is mixed with purified water to obtain a homogeneous slurry. The obtained alumina gel slurry is dewatered until the water content reaches 60% by mass to 90% by mass and thus a cake is obtained.

In the method for manufacturing the hydroprocessing catalyst according to the present invention, it is preferable that the dewatering of this alumina gel slurry be carried out by a pressure filtration apparatus. The dewatering carried out by a pressure filtration apparatus can improve the surface state of the alumina carrier and is advantageous in improving the level of degree of sulfurization of catalyst active metals (hydrogenation-active metals), which will be described later. The dewatering step using the pressure filtration apparatus is preferably carried out after at least one of a step of preparing an alumina gel and a step of kneading a phosphorus compound and silica, which will be described later, and may be carried out after both steps. More preferably, the dewatering step is carried out before the step of kneading a phosphorus compound and silica and after the step of preparing an alumina gel.

Here, the pressure filtration apparatus is a filter for filtering slurry by applying pressurized air or pump pressure to the slurry and is also generally called a filter press. Two types of pressure filtration apparatus are a plate and frame type and a recessed plate type. In the plate and frame type filter press, filter plates and filter frames are fastened alternately between end plates and slurry is filtered by press-injecting the slurry into the filter frame. The filter plate has a groove which is a filtrate passage and a furnace cloth is attached to a furnace frame. On the other hand, in the recessed plate type filter press, filter cloths and recessed plate type filter plates are arranged and fastened alternately between end plates to form filter chambers (reference literature: Chemical Engineers' Handbook p. 715).

In addition to the above method, as a method for preparing the alumina gel, a method of neutralizing an aqueous solution containing the raw material for alumina with a neutralizing agent such as a base such as ammonia, aluminic acid, sodium aluminate, or the like, a method of mixing an aqueous solution containing the raw material for alumina with a precipitating agent, such as hexamethylenetetramine, or calcium carbonate, and the like may be used. Although not particularly limited, the amount of the neutralizing agent used is preferably 30% by mass to 70% by mass with respect to the total amount of the aqueous solution containing the raw material for alumina and the neutralizing agent. Although not particularly limited, the amount of the precipitating agent is preferably 30% by mass to 70% by mass with respect to the total amount of the aqueous solution containing the raw material for alumina and the precipitating agent.

Next, a phosphorus compound and silica are added to the obtained alumina gel while kneading. Specifically, an aqueous phosphorus compound solution heated to 15° C. to 90° C. and silica are added to the alumina gel with an adjusted water content, which has been heated to 50° C. to 90° C., and the resultant mixture is kneaded and stirred using a heated kneader or the like, thereby obtaining a kneaded mixture for a phosphorus-silica-containing alumina carrier. As described above, dewatering with the pressure filtration apparatus may be carried out after the alumina gel, a phosphorus compound, and silica are kneaded and stirred.

Subsequently, the obtained kneaded mixture is molded, dried and calcined to obtain a phosphorus-silica-containing alumina carrier.

When the obtained kneaded mixture is molded, various molding methods such as extrusion and press molding can be carried out.

In addition, when the obtained molding is dried, the drying temperature is preferably 15° C. to 150° C. and particularly preferably 80° C. to 120° C., and the drying time is preferably 30 minutes or longer.

When the obtained dried product is calcined, the calcination temperature can be appropriately set as required. For example, in order to obtain γ-alumina, calcination is carried out preferably at 450° C. or higher and more preferably 480° C. to 600° C. The calcination time is preferably 2 hours or longer and particularly preferably 3 hours to 12 hours.

It is preferable that the phosphorus-silica-containing alumina carrier of the hydroprocessing catalyst according to the present invention have the following physical property values.

The specific surface area of the phosphorus-silica-containing alumina carrier is a value measured by a nitrogen adsorption method (BET method) and is preferably 200 m$^2$/g to 380 m$^2$/g and more preferably 220 m$^2$/g to 360 m$^2$/g.

When the specific surface area is too small, the dispersibility of the hydrogen active metals is poor and desulfurization activity easily becomes low. When the specific surface area is too large, the pore diameter becomes extremely small and thus the pore diameter of the catalyst is also reduced. Thus, during hydrogenation, the sulfur compounds do not sufficiently diffuse into the pores of the catalyst and thus desulfurization activity easily becomes low. When the specific surface area of the phosphorus-silica-containing alumina carrier is set to be within the above range, the dispersibility of the hydrogen active metals becomes satisfactory and a hydroprocessing catalyst having a sufficiently large pore diameter can be obtained.

The average pore diameter of the phosphorus-silica-containing alumina carrier measured by a mercury penetration method in the pore distribution is preferably 5 nm to 12 nm and more preferably 6 nm to 10 nm.

When the average pore diameter of the phosphorus-silica-containing alumina carrier is set to be within the above range, the dispersibility of a reactant into the pores becomes satisfactory while the carrier has a sufficient surface area in the pores, and the desulfurization reaction effectively proceeds. Thus, desulfurization activity is further improved.

The pore volume of the phosphorus-silica-containing alumina carrier is a value measured by a mercury penetration method and is preferably 0.4 mL/g to 0.9 mL/g and more preferably 0.6 mL/g to 0.8 mL/g.

In the case in which the pore volume is too small, when the catalyst is prepared in a usual impregnation method, the amount of the solvent infiltrating into the pore volume is small. When the amount of a solvent is small, the solubility of the hydrogenation-active metals becomes poor and the dispersibility of the metals decreases. Thus, a catalyst having a low activity is easily obtained. In order to raise the solubility of the hydrogenation-active metals, a method of adding a large amount of an acid such as nitric acid may be used. However, addition of an excessive amount of an acid decreases the surface area of the carrier and is a main factor of causing deterioration in desulfurization performance. On the other hand, when the pore volume is too large, the specific surface area becomes extremely small and thus the dispersibility of the active metals easily decreases.

When the pore volume of the phosphorus-silica-containing alumina carrier is set to be within the above range, the carrier has a sufficient specific surface area and the amount of the solvent infiltrating into the pore volume is sufficient, the solubility and dispersibility of the hydrogenation-active metals are satisfactory and desulfurization activity is further improved.

On the phosphorus-silica-containing alumina carrier, at least one selected from Group 6 metals and at least one selected from Group 8 to 10 metals are supported such that 8% by mass to 20% by mass of at least one selected from Group 6 metals in terms of oxide based on the catalyst and 2% by mass to 5 by mass of at least one selected from Group 8 to 10 metals in terms of oxide based on the catalyst are incorporated. Thus, the hydroprocessing catalyst according to the present invention can be produced.

Here, regarding the contents of the Group 6 metal and the Group 8 to 10 metal, the term "in terms of oxide based on the catalyst" refers to a ratio of an oxide mass to the total mass obtained by calculating the total mass of all elements included in the carrier as respective oxides. The oxide mass of the Group 6 metal and the Group 8 to 10 metal is obtained by converting the Group 6 metal to hexavalent oxides and the Group 8 to 10 metal to divalent oxides.

Examples of the Group 6 metal include molybdenum (Mo), tungsten (W), chromium (Cr), and among these, Mo exhibiting a high activity per unit mass is preferable. Examples of Mo supported on the phosphorus-silica-containing alumina carrier include molybdenum trioxide, molybdophosphoric acid, ammonium molybdate, molybdic acid and the like. Molybdophosphoric acid, molybdenum trioxide, and ammonium molybdate are preferable.

The Group 6 metal content in the phosphorus-silica-containing alumina carrier is preferably 8% by mass to 20% by mass and more preferably 10% by mass to 16% by mass in terms of oxide based on the catalyst.

When the Group 6 metal content is 8% by mass or more, the effect of the addition of the Group 6 metal can be sufficiently exhibited. When the Group 6 metal content is 20% by mass or less, the Group 6 metal disperses effectively. In addition, catalyst activity is improved without causing a significant decrease in the catalyst surface area.

Examples of the Group 8 to 10 metal include nickel (Ni) and cobalt (Co), and among them, Ni high in hydrogenation performance and low in catalyst preparation cost is preferable. Examples of Ni compounds supported on the phosphorus-silica-containing alumina carrier include a carbonate, an acetate, a nitrate, a sulfate, and a chloride of Ni, a carbonate and an acetate are preferable and a carbonate is more preferable.

The Group 8 to 10 metal content in the phosphorus-silica-containing alumina carrier is 2% by mass to 6% by mass and preferably 2.5% by mass to 4.5% by mass in terms of oxide based on the catalyst.

When the Group 8 to 10 metal content is 2% by mass or more, sufficient active sites belonging to the Group 8 to 10 metal are obtained. On the other hand, when the Group 8 to 10 metal content is 5% by mass or less, aggregation of the Group 8 to 10 metal does not easily occur and the dispersibility of the active metals is not deteriorated. For example, in a case of using Ni, a NiO species (which is present as a NiS species after catalyst sulfurization or during hydrogenation) as an inactive precursor or a Ni spinel species enclosed in the lattice of the carrier is not easily formed and thus catalyst activity is improved.

In the content of each component of the Group 6 metal and the Group 8 to 10 metal, the optimal mass ratio between the Group 6 metal and the Group 8 to 10 metal, which are hydrogenation-active metals, is a value of [Group 8 to 10 metal oxide mass]/([Group 8 to 10 metal oxide mass]+[Group 6 metal oxide mass]) and is preferably 0.14 to 0.3.

When the mass ratio of the Group 8 to 10 metal to the total amount of the Group 6 metal and the Group 8 to 10 metal is too low, an active metal-sulfur phase such as a NiMoS phase or a NiWS phase, which can be thought of as active sites for desulfurization, cannot be sufficiently formed and desulfurization activity is not easily improved. When the mass ratio of the Group 8 to 10 metal is too high, an unnecessary metal species (such as a NiS species or a Ni spinel species enclosed in the lattice of the carrier) not contributing to activity is formed and thus catalyst activity is easily reduced. When the mass ratio of the Group 8 to 10 metal is set to be within the above range, an active metal-sulfur phase is sufficiently formed and an unnecessary metal species not contributing to activity can be inhibited from being formed.

As a method for supporting the Group 6 metal and the Group 8 to 10 metal on the phosphorus-silica-containing alumina carrier, a known method such as an impregnation method or a coprecipitation method may be used. For example, like a method in which in a state in which the phosphorus-silica-containing alumina carrier is immersed in a solution containing these hydrogenation-active metal components, the hydrogenation-active metal components are precipitated, an impregnation method in which the phosphorus-silica-containing alumina carrier is brought into contact with a solution containing the hydrogenation-active metal components and the hydrogenation-active metals are supported on the phosphorus-silica-containing alumina carrier can be adopted. As a method for impregnating the phosphorus-silica-containing alumina carrier with the Group 6 metal and the Group 8 to 10 metal, a one-step impregnation method performed by simultaneous impregnation of the respective components or a two-step impregnation method performed by individual impregnation of the respective components may be used.

As a specific method for supporting the Group 6 metal and the Group 8 to 10 metal on the phosphorus-silica-containing alumina carrier, the following method can be used. First, a solution for immersion including a Group 6 metal compound, a Group 8 to 10 metal compound, and a phosphorus compound is prepared. When the metal compounds contain phosphorus, a phosphorus compound is not added or an appropriate amount of a phosphorus compound is added. During the preparation, to accelerate the dissolution of these compounds, heating may be carried out (30° C. to 100° C.) or an acid (such as nitric acid, phosphoric acid, or organic acid such as citric acid, acetic acid, malic acid, or tartaric acid) may be added.

Here, the mass ratio of phosphorus to be kneaded into the carrier with respect to the Group 6 metal in terms of oxide is preferably 0.25 or less. When the mass ratio of phosphorus is 0.25 or less, the surface area and pore volume of the catalyst do not decrease and hence the activity of the catalyst is not reduced as well as acid amount does not increase and carbon precipitation can be prevented. Thus, activity deterioration is suppressed.

Subsequently, the prepared phosphorus-silica-containing alumina carrier is impregnated with the prepared solution for immersion by gradually adding the solution to the phosphorus-silica-containing alumina carrier so as to become homogeneous. The impregnation time is preferably 1 minute to 5 hours and more preferably 5 minutes to 3 hours, and the temperature is preferably 5° C. to 100° C. and more preferably 10° C. to 80° C. Although the atmosphere is not particularly limited, any atmosphere of air, a nitrogen stream and a vacuum is suitable for impregnation.

After the Group 6 metal and Group 8 to 10 metal components are supported on the carrier and the carrier is impregnated with the metal components, generally, the water in the carrier is removed to some degree (to LOI (Loss on ignition) of 50% or lower) at a temperature of room temperature to 80° C. in air or a nitrogen stream or under a vacuum. Then, drying is conducted in a drying furnace in an air stream at a temperature of 80° C. to 150° C. for 10 minutes to 10 hours. Next, calcination is carried out in a calcination furnace in an air stream at a temperature of preferably 300° C. to 700° C., more preferably 500° C. to 650° C., for preferably 10 minutes to 10 hours, more preferably 3 hours or longer.

It is preferable that the specific surface area, pore volume, average pore diameter, and pore distribution of the hydroprocessing catalyst according to the present invention be adjusted to be within the following ranges in order to enhance hydrogenation activity and desulfurization activity with respect to heavy hydrocarbon oil.

The specific surface area of the hydroprocessing catalyst according to the present invention is a value measured by a BET method and is preferably 180 $m^2/g$ to 320 $m^2/g$ and more preferably 200 $m^2/g$ to 300 $m^2/g$. When the specific surface area is too small, the dispersibility of the hydrogenation-active metals becomes poor and when the specific surface area is too large, the pore diameter becomes extremely small and thus, the pore diameter of the catalyst also becomes small. When the specific surface area of the hydroprocessing catalyst according to the present invention is set to be within the above range, the dispersibility of the hydrogenation-active metals and the diffusibility of sulfur compounds into the pores of the catalyst during hydrogenation can be further improved.

The pore volume of the hydroprocessing catalyst according to the present invention is a value measured by a mercury penetration method and is preferably 0.45 mL/g to 0.8 mL/g and more preferably 0.5 mL/g to 0.7 mL/g. When the pore volume is too small, insufficient diffusibility of sulfur compounds into the pores of the catalyst during hydrogenation is easily obtained. When the pore volume is too large, the specific surface area easily become extremely small. When the pore volume of the hydroprocessing catalyst according to the present invention is set to be within the above range, the dispersibility of the hydrogenation-active metals and the diffusibility of sulfur compounds into the pores of the catalyst during hydrogenation can be further improved.

The average pore diameter of the hydroprocessing catalyst according to the present invention measured by a mercury penetration method in the pore distribution is preferably 7 nm to 13 nm and more preferably 7 nm to 12 nm. When the average pore diameter of the hydroprocessing catalyst according to the present invention is set to be within the above range, the dispersibility of a reactant into the pores becomes satisfactory while the carrier has a sufficient surface area in the pores (that is, an effective specific surface area of the catalyst), and thus desulfurization activity can be further improved.

In addition, in order to increase the effective number of pores satisfying the pore conditions, the hydroprocessing catalyst according to the present invention has a pore distribution in which the ratio of the total volume of pores having a pore diameter of the average pore diameter ±1.5 nm to the total pore volume is preferably 45% or more and more preferably 55% or more.

Further, the state of distribution of the hydrogenation-active metals in the hydroprocessing catalyst according to the present invention is preferably of a uniform type in which the active metals are homogeneously distributed in the catalyst.

When heavy hydrocarbon oil is subjected to hydroprocessing using the hydroprocessing catalyst according to the present invention, the sulfur compounds in the heavy hydrocarbon oil can be reduced for a long period of time and the storage stability of a hydroprocessed oil which is obtained can be improved.

The hydroprocessing catalyst according to the present invention is generally activated by sulfurization in a reactor before being used (that is, before the hydroprocessing method according to the present invention is carried out).

The sulfurization is generally conducted using a sulfur compound-containing petroleum distillate and a compound obtained by adding thereto a sulfiding agent such as a dimethyl disulfide or carbon disulfide, or using hydrogen sulfide at a temperature of 200° C. to 400° C., preferably 250° C. to 350° C., under a hydrogen atmosphere having normal pressure or a hydrogen partial pressure higher than normal pressure.

<Hydroprocessing Method>

A hydroprocessing method according to the present invention is a hydroprocessing method of bringing heavy hydrocarbon oil into contact with three types of catalyst (a front stage catalyst, a middle stage catalyst, and a rear stage catalyst), in which as the rear stage catalyst, the hydroprocessing catalyst according to the present invention is used, as the front stage catalyst, a catalyst in which hydrogenation-active metals are supported on an inorganic oxide carrier containing zinc oxide is used, and as the rear stage catalyst, a catalyst in which hydrogenation-active metals are supported on a silica-containing porous alumina carrier is used.

The three types of catalyst used in the hydroprocessing method according to the present invention respectively are mainly required to have different performance characteristics. In the front stage catalyst, metal resistance performance and demetallization activity for protecting catalysts after a middle stage are mainly required. The middle stage catalyst is required to have metal resistance performance, demetallization activity, and desulfurization performance with good balance. The rear stage catalyst is mainly required to have desulfurization performance. Further, it is preferable that all three types of catalyst have a predetermined catalyst strength. From the above viewpoint, the respective catalysts are required to have specific physical properties.

<Front Stage Catalyst>

In the hydroprocessing method according to the present invention, the inorganic oxide carrier of the catalyst used as the front stage catalyst contains 1% by mass to 15% by mass, preferably 2% by mass to 12% by mass, of zinc oxide based on the carrier. In addition, the average particle diameter of zinc oxide contained in the inorganic oxide carrier is preferably 2 μm to 12 μm, more preferably 4 μm to 10 μm, and still more preferably 5 μm to 9 μm.

The particle diameter of the zinc oxide particles is measured by a laser diffraction and scattering method according to JIS R1629 and the average particle diameter is set at the volume average of the particle size distribution. In addition, the purity of the zinc oxide is preferably 99% or higher.

The inorganic oxide carrier of the respective catalysts used as the front stage catalyst includes inorganic compounds other than zinc oxide.

As the inorganic compounds, porous compounds are preferable and examples thereof include alumina, silica, silica-alumina, titania, boria, manganese, and zirconia. These compounds may be used alone or in combination of two or more.

In the front stage catalyst, when the zinc oxide content in the inorganic oxide carrier is in the above range, while maintaining catalyst strength with other physical property values, the average pore diameter can be increased. Thus, a catalyst having excellent metal resistance performance and demetallization activity is obtained.

When the zinc oxide content is 1% by mass or more, the content is sufficient to improve the degree of sulfurization of the Group 6 metal and when the zinc oxide content is 15% by mass or less, the pore volume and the specific surface area are not easily reduced, the Group 6 metal can easily disperse, and the degree of sulfurization of the Group 8 to 10 metal is not easily decreased.

In addition, when the average particle diameter of the zinc oxide particles is 12 μm or less, the zinc oxide sufficiently interacts with alumina to exhibit an effect of improving storage stability of hydroprocessed heavy hydrocarbon oil. When the average particle diameter of the zinc oxide particles is 2 μm or more, the zinc oxide can be easily mixed with alumina at the time of manufacturing of the carrier and the manufacturing process is further simplified.

For the catalyst preparation for the front stage catalyst used in the hydroprocessing method according to the present invention, typical methods can be adopted. For example, in the case of using alumina as a main component of the inorganic oxide carrier, alumina can be manufactured by various methods.

Specifically, a water-soluble aluminum compound, for example, a sulfate, a nitrate, or a chloride of aluminum, is neutralized with a base such as ammonia, an alkali metal aluminate is neutralized with an acid aluminum salt, an acid, or the like to obtain an aluminum hydrogel. A typical alumina carrier can be manufactured through general steps of performing aging, washing, dewatering and drying, water content adjustment, molding, drying, calcination and the like on an alumina gel.

The zinc oxide-containing alumina carrier of the catalyst used as the front stage catalyst in the hydroprocessing method according to the present invention is preferably manufactured by adjusting the water content by adding zinc oxide to the alumina gel, and adding a kneading step before the molding step. As a method for supporting the hydrogenation-active metals on the obtained zinc oxide-containing alumina carrier, an impregnation method is preferable.

The front stage catalyst used in the hydroprocessing method according to the present invention is a catalyst in which predetermined amounts of hydrogenation-active metals, preferably at least one from Group 6 metals and at least one selected from Group 8 to 10 metals, on the inorganic oxide carrier thus prepared are supported.

As the Group 6 metals, any metals may be used as long as the metals belong to Group 6, and Mo or W is more preferable and Mo is particularly preferable.

As the Group 8 to 10 metals, any metals may be used as long as the metals belong to Groups 8 to 10, and Co or Ni is more preferably and Ni is particularly preferable.

Further, as the metals to be supported, one active metal may be used or two or more active metals may be used in combination.

In the front stage catalyst, the amount of at least one selected from the Group 6 metals supported is 2% by mass to 15% by mass and preferably 5% by mass to 10% by mass in terms of oxide based on the catalyst. The amount of at least one selected from the Group 8 to 10 metals supported is 0.001% by mass to 5% by mass and preferably 1% by mass to 4% by mass in terms of oxide based on the catalyst.

When the amount of at least one active metal selected from the Group 6 metals supported is equal to or more than the lower limit, hydrogenation activity is easily improved. When the amount of at least one active metal supported is equal to or less than the upper limit, metal resistance performance is easily improved.

When the amount of at least one active metal selected from the Group 8 to 10 metals supported is equal to or more than the lower limit, the effect of the Group 6 metal is not easily deteriorated. When the amount of at least one active metal supported is equal to or less than the upper limit, metal resistance performance is easily improved.

The specific surface area of the front stage catalyst is in a range of 70 m$^2$/g to 150 m$^2$/g and preferably in a range of 90 m$^2$/g to 140 m$^2$/g. When the specific surface area is equal to or more than the lower limit, catalyst activity is not easily reduced. When the specific surface area is equal to or less than the upper limit, the average pore diameter tends to increase and metal resistance performance is not decreased. The diffusibility of a metal compound of Ni or V into pores can be obtained and thus demetallization activity is improved.

The pore volume of the front stage catalyst is in a range of 0.6 mL/g to 1 mL/g and preferably in a range of 0.65 mL/g to 1 mL/g. When the pore volume is equal to or more than the lower limit, metal resistance performance is not easily decreased and the diffusibility of a metal compound of Ni or V into pores is not easily decreased. Thus, demetallization activity can be obtained. On the other hand, when the pore volume is equal to or less than the upper limit, the surface area is not easily decreased and high catalyst activity can be obtained.

The average pore diameter of the front stage catalyst is in a range of 15 nm to 35 nm and preferably in a range of 18 nm to 30 nm. When the average pore diameter is equal to or more than the lower limit, metal resistance performance is not easily decreased and the diffusibility of a metal compound of Ni or V into pores is not easily decreased. Thus, demetallization activity is not easily reduced. On the other hand, when the pore volume is equal to or less than the upper limit, a large surface area can be obtained and thus high catalyst activity can be obtained.

In the front stage catalyst, a ratio of the total volume of pores having a pore diameter in a range of ±2.0 nm from the average pore diameter of the catalyst to the total pore volume is in a range of 15% to 50% and preferably in a range of 20% to 50%. When the ratio of the total volume of pores having a pore diameter in a range of ±2.0 nm from the average pore diameter to the total pore volume is equal to or more than the lower limit, pores not useful to a hydrogenation reaction of a metal compound of Ni or V are not easily formed and demetallization activity is easily improved.

<Middle Stage Catalyst>

In the hydroprocessing method according to the present invention, as the carrier of the middle stage catalyst, a silica-containing porous alumina carrier containing 0.1% by mass to 1.5% by mass of silica based on the carrier.

A method for preparing the silica-containing porous alumina carrier is not particularly limited and the silica-containing porous alumina carrier can be prepared by a general method. For example, two types of alumina gel having different particle diameters can be respectively prepared. The silica-containing porous alumina carrier can be prepared by adding silica in each step of mixing these alumina gels and aging the mixture. In addition, after one type of alumina gel is prepared, the pH of the solution can be prepared and silica can be added, thereby preparing the silica-containing porous alumina carrier. The alumina gel can be formed by neutralizing aluminum sulfate or aluminum nitrate, which are water-soluble aluminum compounds, with a base such as ammonia or by neutralizing an alkali metal aluminate such as sodium aluminate with an acid aluminum salt or an acid.

The amount of silica included in the silica-containing porous alumina carrier of the middle stage catalyst is 0.1% by mass to 1.5% by mass and preferably 0.1% by mass to 1.2% by mass based on the carrier. When the silica content is 0.1% by mass or more, acid sites by Group 6 metal and Group 8 to 10 metal are optimally formed. On the other hand, when the silica content is 1.5% by mass or less, acid sites that are expressed by the addition of silica are not easily expressed and a decomposition reaction does not easily occur. Thus, sediment is not easily produced.

Alumina as a raw material for a hydrogenation catalyst having a specific pore diameter or pore volume similar to the carrier of the middle stage catalyst can be prepared by, for example, the pH, the concentration of these agents, the time, the temperature, and the like when an alumina gel is prepared by adding a precipitating agent or a neutralizing agent. Generally, the pore diameter and the pore volume decrease on an acidic side and the pore diameter and the pore volume increase on a base side.

In addition, when the aging time becomes shorter, the pore diameter can be reduced and when the aging time becomes longer, a sharp pore distribution can be obtained.

For example, an alumina gel in which an alumina carrier has an average pore diameter of 5 nm to 10 nm after calcination can be obtained by adjusting the pH at the time of gel formation to 3 to 7 and adjusting the temperature to a range of 15° C. to 90° C. In addition, an alumina gel in which an alumina carrier has an average pore diameter of 10 nm to 15 nm after calcination can be obtained by adjusting the pH at the time of gel formation to 7 to 11 and adjusting the temperature to a range of 30° C. to 90° C.

When an alumina carrier is obtained by mixing two types of alumina gel having different particle diameters, two types of alumina gel having different particle diameters are respectively prepared by the above-described method, then these alumina gels are mixed, aged, and washed, and the water content thereof is adjusted. At this time, the respective alumina gels are mixed according to a target catalyst pore distribution. The mixing ratio of the respective gels is adjusted according to a target catalyst pore structure.

Typically, by conducting gelation at a pH of 4 to 9 and a temperature of 40° C. to 90° C. for 1 hour to 10 hours, the total volume of pores having a pore diameter of 30 nm or more can be controlled to become 3% or less of the total pore volume and also impurities present in the alumina gel after aging can be easily removed. On the other hand, when an alumina carrier is prepared from one type of alumina gel, for example, the carrier can be prepared in the following manner.

First, a solution containing alumina gel in which an alumina carrier has an average pore diameter of 10 nm to 15 nm after calcination is prepared by the above-described method, and an acid solution such as nitric acid is added to the alumina gel-containing solution. At this time, the pH of the alumina gel-containing solution, temperature, time and the like are adjusted to obtain a target catalyst pore structure. Typically, gelation is conducted at a pH of 3 to 7 and a reaction temperature of 30° C. to 90° C. for a reaction time of 0.1 hours to 10 hours. At this time, a ratio of the total volume of pores having a pore diameter of 5 nm to 10 nm to the total volume of pores having a pore diameter of 3 nm to 30 nm can be increased by adjusting the pH toward an acidic side, setting a high reaction temperature, and increasing the reaction time.

These alumina gels are washed to remove impurities and then the water content is adjusted by drying or adding water. The catalyst is easily molded by adjusting the water content. The water content after the water content adjustment is preferably 60% by mass to 90% by mass. In addition, an alumina micro-surface structure can be controlled by changing a primary drying temperature and method for adjusting the water content.

When the hydroprocessing catalyst according to the present invention is prepared, the temperature of the primary drying is preferably lower than 100° C. and a method of performing natural filtration, suction filtration, and pressure filtration at about 0.01 MPa to 2 MPa, while minimizing heating, is more preferable. Thereby, the desulfurization performance of the hydroprocessing catalyst can be increased.

The alumina gel whose water content has been adjusted is used to mold a carrier. The molding method is not particularly limited and a typical method such as extrusion molding or tablet molding can be used. The pore distribution of alumina can also be controlled by adjusting the pressure and the speed at the time of molding. The hydroprocessing catalyst according to the present invention is not particularly limited by shape and can have various shapes of general catalysts. As the shape of the hydroprocessing catalyst according to the present invention, a three-leaf or four-leaf shape is preferable.

A silica-containing porous alumina carrier is obtained by calcining the molded alumina gel. The molded alumina gel is kept at a temperature of, preferably 15° C. to 150° C., more preferably 100° C. to 120° C., for 5 hours or longer, more preferably 12 hours to 24 hours before the calcination. Further, calcination is performed by keeping the alumina gel at a temperature of preferably 350° C. to 600° C., more preferably 400° C. to 550° C., for preferably 3 hours or longer, more preferably 5 hours to 12 hours.

In the middle stage catalyst, a hydrogenation-active component, preferably, at least one selected from Group 6 metals and Group 8 and 10 metals are supported on the silica-containing porous alumina carrier prepared as described above.

As the Group 6 metal, any metals may be used as long as the metals belong to Group 6, and Mo or W is particularly preferable.

As the Group 8 to 10 metal, any metals may be used as long as the metals belong to Groups 8 to 10, and Co or Ni is particularly preferable.

Further, as the metals to be supported, one active metal may be used or two or more active metals may be used in combination.

A method for supporting the hydrogenation-active metal on the carrier is not particularly limited and typical methods, for example, various methods such as an impregnation method, a coprecipitation method, a kneading method, a precipitation method, and an ion exchange method can be adopted.

When the Group 6 metal and the Group 8 to 10 metal are supported, any of these metals may be supported in any order and both metals may be supported at the same time.

A compound used in an impregnation method or the like as a solution is not particularly limited. Examples of nickel compounds include a nitrate, a sulfate, a fluoride, a chloride, a bromide, an acetate, a carbonate, and a phosphate of nickel. In addition, examples of molybdenum compounds include ammonium paramolybdate, molybdic acid, ammonium molybdate, phosphomolybdic acid, ammonium phosphomolybdate, and phosphomolybdic acid.

Irrespective of which of various methods the middle stage catalyst is prepared by, such as an impregnation method, a coprecipitation method, a kneading method, a precipitation method, and an ion exchange method, at least one compound of a metal selected from the Group 6 metal and the Group 8 to 10 metal is supported on the silica-containing porous alumina carrier and then the carrier is dried and calcined to produce the catalyst.

Drying is performed by keeping the carrier at a temperature of, preferably 15° C. to 150° C., more preferably 100° C. to 120° C., for 5 hours or longer, more preferably 12 hours to 24 hours. Calcination is performed by keeping the carrier at a temperature of, preferably 350° C. to 600° C., more preferably 400° C. to 550° C., for 3 hours or longer, preferably 12 hours to 24 hours.

The amount of these active metal components supported can be appropriately selected according to the physical properties of the alumina carrier or a combined state of metal active species to be supported. Regarding the amount of these active metal components supported on the middle stage catalyst, the amount of the Group 6 metal supported is preferably 3% by mass to 30% by mass, more preferably 5% by mass to 25% by mass, and still more preferably 8% by mass to 20% by mass in terms of oxide based on the catalyst. In addition, the amount of the Group 8 to 10 metal supported is preferably 0.5% by mass to 18% by mass, more preferably 1% by mass to 10% by mass, and still more preferably 2% by mass to 8% by mass.

When the amount of the Group 6 metal is 3% by mass or more, a predetermined metal supporting effect can be sufficiently exhibited and when the amount of the Group 6 metal is 30% by mass or less, aggregation of the active metals does not easily occur and the pore volume of the catalyst can be prevented from being significantly reduced.

When the amount of the Group 8 to 10 metal is 0.5% by mass or more, the metal supporting effect can be sufficiently exhibited and when the amount the Group 8 to 10 metal is 18% by mass or less, an appropriate supporting effect can be obtained and excellent economical efficiency can be obtained.

The middle stage catalyst having a pore distribution satisfying the following conditions can be obtained by supporting the hydrogenation-active metal components on the carrier and drying and calcining the carrier.

(1) The total volume of pores having a pore diameter of 5 nm to 10 nm is 30% to 45% of the total volume of pores having a pore diameter of 3 nm to 30 nm.

(2) The total volume of pores having a pore diameter of 10 nm to 15 nm is 50% to 65% of the total volume of pores having a pore diameter of 3 nm to 30 nm.

(3) The total volume of pores having a pore diameter of 30 nm or more is 3% or less of the total pore volume.

When the total volume of pores having a pore diameter of 5 nm to 10 nm is 30% or more of the total volume of pores having a pore diameter of 3 nm to 30 nm, sufficient desulfurization activity is obtained and when the total volume of pores having a pore diameter of 5 nm to 10 nm is 45% or less of the total volume of pores having a pore diameter of 3 nm to 30 nm, catalyst life is extended without deteriorating metal resistance performance.

In addition, when the total volume of pores having a pore diameter of 10 nm to 15 nm is 50% or more of the total volume of pores having a pore diameter of 3 nm to 30 nm, excellent metal resistance performance is not easily deteriorated and catalyst life is extended. On the other hand, when the total volume of pores having a pore diameter of 10 nm to 15 nm is 65% or less of the total volume of pores having a pore diameter of 3 nm to 30 nm, desulfurization activity is not easily reduced and sufficient catalytic activity can be obtained.

Further, when the total volume of pores having a pore diameter of 30 nm or more is 3% or less of the total pore volume, desulfurization activity is not easily reduced and sufficient desulfurization activity can be obtained.

Further, (4) The average pore diameter of pores having a pore diameter of 10 nm to 30 nm is 10.5 nm to 13 nm, and (5) The total volume of pores having a pore diameter in a range of ±1 nm from the average pore diameter is 25% or more of the total volume of pores having a pore diameter of 3 nm to 30 nm.

When the average pore diameter of pores having a pore diameter of 10 nm to 30 nm is 10.5 nm or more, sufficient metal resistance performance is obtained and catalyst life is extended. On the other hand, when the average pore diameter is 13 nm or less, desulfurization activity is not reduced and sufficient desulfurization is obtained.

The total volume of pores having a pore diameter in a range of ±1 nm from the average pore diameter is preferably 25% or more, more preferably 30% to 65%, and still more preferably 35% to 50%, of the total volume of pores having a pore diameter of 3 nm to 30 nm. When the total volume of pores having a pore diameter in a range of ±1 nm from the average pore diameter is 25% or more of the total volume of pores having a pore diameter of 3 nm to 30 nm, sufficient desulfurization activity is obtained.

In the middle stage catalyst, the average pore diameter of pores having a pore diameter of 10 nm to 30 nm can be set to 10.5 nm to 13 nm and the total volume of pores having a pore diameter in a range of ±1 nm from the average pore diameter can be set to 25% or more of the total volume of pores having a pore diameter of 3 nm to 30 nm by, in the case of preparing the silica-containing porous alumina carrier of the hydrogenation treatment catalyst from two types of alumina gel, mixing the respective alumina gels according to a target catalyst pore structure.

On the other hand, in the case of preparing the silica-containing porous alumina carrier of the middle stage catalyst from one type of alumina gel, the carrier can be prepared by adjusting the aging time when the alumina gel is prepared by adding a precipitating agent or a neutralizing agent. Generally, as the aging time becomes shorter, the pore diameter can be decreased and as the aging time becomes longer, a sharp pore distribution can be obtained.

From the viewpoint of metal resistance performance, the total pore volume of the middle stage catalyst is preferably 0.55 mL/g to 0.75 mL/g and more preferably 0.60 mL/g to 0.70 mL/g. When the total pore volume is 0.55 mL/g or more, metal resistance performance is not easily reduced and catalyst life is extended. In addition, when the total pore volume is 0.75 mL/g or less, a large surface area is obtained and desulfurization performance is improved.

The total pore volume can be set to be in the above range by adjusting the pH when the alumina gel is prepared by adding a precipitating agent or a neutralizing agent. Generally, when the pH when the alumina gel is prepared is acidic, the pore volume becomes small and when the pH is alkaline, the pore volume becomes large.

In the hydroprocessing method according to the present invention, the packing rate of the front stage catalyst is 10% to 50% and preferably 15% to 40% with respect to the total catalyst volume, the packing ratio of the middle stage catalyst is 10% to 50% and preferably 15% to 40% with respect to the total catalyst volume, and the packing ratio of the rear stage catalyst is 20% to 70% and preferably 30% to 65% with respect to the total catalyst volume. This range is suitable for maintaining the catalyst life, the desulfurization activity, and the demetallization activity of the entire catalyst system.

The conditions for hydroprocessing in the hydroprocessing method according to the present invention are such that the temperature is 300° C. to 420° C. and preferably 350° C. to 410° C., the liquid space velocity (LHSV) is 0.1 $h^{-1}$ to 3 $h^{-1}$ and preferably 0.15 $h^{-1}$ to 2 $h^{-1}$, the hydrogen partial pressure is 3 MPa to 20 MPa and preferably 8 MPa to 19 MPa, the hydrogen/oil ratio is 400 $m^3/m^3$ to 3,000 $m^3/m^3$ (NL/L) and preferably 500 $m^3/m^3$ to 1,800 $m^3/m^3$.

Examples of the heavy hydrocarbon oils used in the hydroprocessing method according to the present invention include visbreaking oil which includes atmospheric distillation residual oil, vacuum distillation residual oil, and thermally cracked oil, each obtained from crude oil, tar sand oil and shale oil which are heavy hydrocarbon oils other than petroleum, and mixtures thereof. Atmospheric distillation residual oil, vacuum distillation residual oil, or a mixture thereof is preferable.

In the case of mixing atmospheric distillation residual oil and vacuum distillation residual oil, although the mixing ratio varies depending on the properties thereof the oils are frequently used by mixed the oils such that the mixing ratio of the vacuum distillation residual oil is about 1% by volume to 60% by volume.

As the heavy hydrocarbon oil used in the hydroprocessing method according to the present invention, a heavy hydrocarbon oil having a density of 0.91 $g/cm^3$ to 1.10 $g/cm^3$, particularly 0.95 $g/cm^3$ to 1.05 $g/cm^3$, 2% by mass to 6% by mass, particularly 2% by mass to 5% by mass, of sulfur, 1 ppm to 1,500 ppm, particularly 20 ppm to 400 ppm, of metals such as nickel and vanadium, and 2% by mass to 15% by mass, particularly 3% by mass to 10% by mass, of asphaltene is preferable.

In the hydroprocessing method according to the present invention, hydroprocessing is performed by bringing heavy hydrocarbon oil into contact with a specific catalyst defined in the present invention under the conditions for hydroprocessing to reduce a sulfur content and a heavy metal content in the raw material.

EXAMPLES

Next, embodiments and effects of the present invention will be described more specifically by way of examples and the like, but the present invention is not construed as being limited by these examples.

[Example 1] Preparation of Hydroprocessing Catalyst A

First, a phosphorus-silica-containing alumina carrier was prepared. 1.5 L of a 12% by mass sulfuric acid solution was poured into 100 L of purified water in a stirring pot, and the resulting mixture was heated to 95° C. and then vigorously stirred with a stirring blade for 5 minutes. Then, 3.9 L of sodium aluminate having an alumina concentration of 70 g/L was poured into the stirring pot and aluminum hydroxide was prepared and stirred with a stirring blade for 24 hours. The obtained slurry was charged into a filter and filtered, and water was removed, thereby obtaining a gel. Then, the obtained gel was washed with purified water until $SO_4^{2-}$ or $Na^+$ was not detected in the filtrate. Next, the washed gel was mixed with purified water to obtain a homogeneous slurry. The slurry was charged into a pressure filtration apparatus. The slurry obtained through a filter cloth was interposed between filter plates and the filer plates were compressed to conduct dewatering.

When the water content in the obtained cake reached 80%, the filtration was stopped. The cake was put into a heating type kneader (setting temperature: 80° C.) and sufficiently kneaded so as to become homogeneous. Then, phosphoric acid and silica were added to the kneaded mixture and the mixture was further kneaded so as to become homogeneous. The cake obtained by kneading was extruded and charged into a molding device so as to form a molded product extruded into a four-leaf shape having a major diameter of 1.3 mm and a minor diameter of 1.1 nm. The molded product was dried and calcined at 600° C. for 4 hours to obtain a phosphorus-silica-containing alumina carrier.

In the obtained phosphorus-silica-containing alumina carrier, the phosphorus content was 1.2% by mass in terms of oxide based on the carrier, the silica content was 0.2% by mass based on the carrier, the pore volume was 0.76 mL/g, the specific surface area was 320 m²/g, and the average pore diameter was 7.5 nm.

50.00 g of the phosphorus-silica-containing alumina carrier (a γ-Al₂O₃-based molded product having a four-leaf shape with a diameter of 1.33 mm×1.10 mm) was put into an eggplant-shaped flask. A solution obtained by dissolving 8.76 g of ammonium molybdate in 37.6 g of ion-exchanged water was added dropwise to the phosphorus-silica-containing alumina carrier, and the resulting mixture was then left to stand. Then, the resulting product was dried and then calcined at 500° C. for 4 hours to obtain a molybdenum-supporting phosphorus-silica-containing alumina carrier.

Next, a solution obtained by dissolving 9.27 g of nickel nitrate in 31.8 g of ion-exchanged water was added dropwise to the molybdenum-supporting phosphorus-silica-containing alumina carrier and the resulting mixture left to stand. Then, the resulting product was dried and then calcined at 650° C. for 4 hours to obtain Catalyst A.

[Example 2] (Preparation of Hydroprocessing Catalyst B)

Hydrogenation treatment catalyst B was prepared in the same manner as in Example 1 except that the amount of silica added was changed from 0.2% by mass to 1.0% by mass.

[Comparative Example 1] (Preparation of Hydroprocessing Catalyst a)

Hydrogenation treatment catalyst a was prepared in the same manner as in Example 1 except that the amount of silica added was changed from 0.2% by mass to 0.05% by mass.

[Comparative Example 2] (Preparation of Hydroprocessing Catalyst b)

Hydrogenation treatment catalyst b was prepared in the same manner as in Example 1 except that the amount of silica added was changed from 0.2% by mass to 3.0% by mass.

<Physical Properties and Chemical Properties of Carrier and Catalyst>

The properties of the carriers of Hydroprocessing catalysts A, B, a, and b [the amounts of phosphorus supported (in terms of oxides based on the carrier), the silica content (based on the carrier), the average pore diameter, the specific surface area, and the pore volume] prepared in Examples 1 and 2, and Comparative Examples 1 and 2 are shown in Table 1.

The properties of the carriers of Hydroprocessing catalysts A, B, a, and b [the amounts of Mo and Ni supported (in terms of oxides based on the catalyst), the phosphorus content (in terms of oxide based on the catalyst), and the average pore diameter, the specific surface area, the pore volume, and the pore distribution] prepared in Examples 1 and 2, and Comparative Examples 1 and 2 are shown in Table 2.

In Table 2, "Ni/Mo (upper row) 4/12 (lower row)" in the column "active metals/amount of active metals (% by mass)" means that the catalyst contains 4% by mass of Ni and 12% by mass of Mo in terms of respective oxides based on the catalyst.

In addition, in Table 2, the column "pore distribution" refers to a ratio of the total volume of pores having a diameter of the average pore diameter ±1.5 nm to the total pore volume.

The physical properties and chemical properties of the catalysts were measured in the following procedures.

[1] Determination of Physical Properties (Specific Surface Area, Pore Volume, Average Pore Diameter, and Pore Distribution)

a) Measurement Method and Apparatus Used:

The specific surface area was measured by nitrogen adsorption according to the BET method. As the nitrogen adsorption apparatus, a surface area measuring apparatus (Belsorp-mini) manufactured by BEL Japan, Inc. was used.

The pore volume, average pore diameter, and pore distribution were measured by a mercury penetration method. As the mercury penetration apparatus, a porosimeter (MICROMERITICS AUTO-PORE 9200, manufactured by Shimadzu Corporation) was used.

b) Measurement Principle:

The mercury penetration method is based on the capillary phenomenon. In the case of mercury and cylindrical pores, the phenomenon is expressed by the following equation. In the equation, D represents a pore diameter, P represents an applied pressure, γ represents a surface tension, and θ represents a contact angle. The volume of the mercury caused to penetrate into the pores was measured as a function of the applied pressure P. The surface tension of the mercury in the pores of the catalyst was set to 484 dyne/cm and the contact angle was set to 130 degrees.

$$D = -(1/P) 4\gamma \cos\theta \qquad \text{Equation}$$

The pore volume is a total mercury volume amount per gram of catalyst having infiltrated into the pores. The average pore diameter is an average value of D calculated as a function of P.

The pore distribution is a distribution of D calculated as a function of P.

c) Measurement Procedures:

1) The power of a vacuum heating degassing apparatus was turned on and it was confirmed that the temperature was set to 400° C. and the degree of vacuum was set to 5×10⁻² Torr or less.

2) An empty sample burette was attached to the vacuum heating degassing apparatus.

3) When the degree of vacuum reached 5×10⁻² Torr or less, the sample burette was closed using the cock and detached from the vacuum heating degassing apparatus, followed by being cooled to allow the weight to be measured.

4) A sample (carrier or catalyst) was put into the sample burette.

5) The sample burette into which the sample was put was attached to the vacuum heating degassing apparatus and was left for 1 hour or longer from when the degree of vacuum reached 5×10⁻² Torr or less.

6) The sample burette into which the sample was put was detached from the vacuum heating degassing apparatus and cooled and the weight was measured to obtain the weight of the sample.

7) The sample was put in a cell for the AUTO-PORE 9200.

8) Measurement was carried out by the AUTO-PORE 9200.

[2] Determination of Chemical Properties a) Determination Method and Used Apparatus:

Metal analysis of the carrier and the catalyst was carried out using an inductively coupled plasma emission spectrometer (ICPS-2000, manufactured by Shimadzu Corporation).

Metal quantitation was carried out by an absolute calibration curve method.

b) Measurement Procedures:

1) 0.05 g of a sample, 1 mL of hydrochloric acid (50% by mass), a drop of hydrofluoric acid, and 1 mL of purified water were charged into a uniseal, followed by heating for decomposition.

2) After the decomposition, the obtained solution was moved to a measuring flask made of polypropylene (having a volume of 50 mL), purified water was added to the flask, and 50 mL of the solution was weighed.

3) The measurement for the solution was carried out using the ICPS-2000.

TABLE 1

| | Example 1 | Example 2 | Comparative Example 1 | Comparative Example 2 |
|---|---|---|---|---|
| Type of catalyst | Catalyst A | Catalyst B | Catalyst a | Catalyst b |
| $P_2O_5$ (% by mass) | 1.2 | 1.1 | 1.2 | 1.3 |
| Silica (% by mass) | 0.2 | 1.0 | 0.05 | 3.0 |
| Average pore diameter (nm) | 7.5 | 7.4 | 7.5 | 7.7 |
| Specific surface area ($m^2/g$) | 320 | 315 | 317 | 322 |
| Pore volume (mL/g) | 0.76 | 0.74 | 0.73 | 0.74 |

TABLE 2

| | Example 1 | Example 2 | Comparative Example 1 | Comparative Example 2 |
|---|---|---|---|---|
| Type of catalyst | Catalyst A | Catalyst B | Catalyst a | Catalyst b |
| Active metals | Ni/Mo | Ni/Mo | Ni/Mo | Ni/Mo |
| Amount of active metals (% by mass) | 4/12 | 4/12 | 4/12 | 4/12 |
| $P_2O_5$ (% by mass) | 1.0 | 0.9 | 1.0 | 1.1 |
| Average pore diameter (nm) | 7.8 | 7.7 | 7.6 | 7.8 |
| Specific surface area ($m^2/g$) | 295 | 290 | 292 | 297 |
| Pore volume (mL/g) | 0.61 | 0.60 | 0.59 | 0.60 |
| Pore distribution (%) | 75 | 74 | 77 | 76 |

<Hydrogenation Reaction of Heavy Hydrocarbon Oil>

Hydrogenation for atmospheric distillation residual oil (AR) having the following properties was carried out by the following procedures. As the hydroprocessing catalysts, Catalysts A, B, a, and b prepared in Examples 1 and 2, and Comparative Examples 1 and 2 were respectively used.

First, the hydroprocessing catalyst was charged into a high-pressure flow type reactor to form a fixed bed type catalyst layer, and then a pre-treatment was carried out under the following conditions. Next, a fluid mixture of a feedstock oil heated to the reaction temperature and a hydrogen-containing gas was introduced from the upper part of the reactor. A desulfurization reaction and a hydrogenation reaction, which is a decomposition reaction, were carried out under the following conditions to produce an oil. A fluid mixture of the product oil and gas was allowed to flow out from the lower part of the reactor and the product oil was separated out by a gas-liquid separator.

The measurement methods were such that the density was measured according to JIS K 2249-1 "Crude petroleum and petroleum products-Determination of density and petroleum measurement tables (oscillation type density testing method)", the sulfur content was measured according to JIS K 2541-4 "Crude oil and petroleum products-Determination of sulfur content, Part 4: Energy-dispersive X-ray fluorescence method", and the potential total sediment content was measured according to JPI-5S-60-2000. Specifically, the potential total sediment content was determined in the following manner.

<Measurement Procedure of Potential Total Sediment Content>

1) 25 g of a sample heated to 60° C. was collected and put into an Erlenmeyer flask, an air condenser was attached to the flask, and the flask was put in an oil bath at 100° C. and left for 24 hours.

2) The sample was sufficiently oscillated and then 10.5 g of the sample was sampled and put into a glass beaker.

3) The glass beaker into which the sample was put was heated at 100° C. for 10 minutes.

4) The sample was charged into a vacuum filter in which 3 sheets of dried glass fiber filter paper (having a diameter of 47 mm and a pore diameter of 1.6 μm) were set in a laminated manner and the pressure was reduced to 80 kPa with a vacuum pump and the pressure was reduced to 40 kPa after 30 seconds.

5) After the filtration was completed and the filter paper surface was dried, the pressure was further reduced continuously for 5 minutes.

6) After the vacuum pump was stopped, the funnel and the entire filter were washed with 25 mL of a cleaning solvent (heptane 85 mL+toluene 15 mL) while drawing up the filter with an aspirator.

7) After the filter paper was further washed with 20 mL of heptane, the uppermost filter paper (the first sheet from the top) was removed and the filter paper underneath was washed with 20 mL of heptane.

8) The first and second filter paper from the top were dried at 110° C. for 20 minutes and then allowed to cool for 30 minutes.

9) The amount of an increase in the weight of the first and second filter paper obtained by comparing the weight after filtration and the weight before filtration was measured, the weight obtained by subtracting the increased weight of the second filter paper from the increased weight of the first filter paper with respect to the weight of the collected sample was expressed as a percentage, and the value was set to the potential total sediment (% by mass).

When the filtration was not finished in 25 minutes, the amount of the sample was reduced to 5 g or 2 g and the measurement was carried out again.

The nickel and vanadium contents were measured according to the Japan Petroleum Institute standard JPI-5S-62-2000 "Petroleum products-Determination of metal content (ICP emission spectrometry)".

For asphaltene, toluene was added to the sample and the mixture was then filtered with a cellulose filter to recover toluene-insoluble components. These insoluble components were considered as asphaltene.

For resins, toluene was added to the sample and then the mixture was filtered with a cellulose filter. Then, the toluene-soluble components as a filtrate were concentrated. A heptane solution obtained by adding heptane to the concentrate was made to flow through an active alumina-charged column and separated into saturates, aromatics, and resins to recover the resins.

(Pre-Treatment Conditions for Catalyst)

Preliminary sulfurization of the catalyst was carried out with a vacuum gas oil at a hydrogen partial pressure of 10.3 MPa and 370° C. for 12 hours. Then, the gas oil was changed to Feedstock oil 1 for activity evaluation.

(Reaction Conditions)

Reaction temperature: 385° C.
Pressure (hydrogen partial pressure): 10.3 MPa
Liquid space velocity: 0.4 h$^{-1}$
Hydrogen/oil ratio: 1,690 m$^3$/m$^3$ (Properties of Feedstock Oil 1)

Type of oil: Atmospheric distillate residual oil of Middle East type crude oil
Density (at 15° C.): 0.9731 g/cm$^3$
Sulfur component: 3.45% by mass
Vanadium: 55 ppm
Nickel: 10 ppm
Asphaltene content: 2.7% by mass The catalytic activity was determined in the following manner. The reactor was operated at 385° C. and an oil produced after 25 days had passed from when the operation started was collected. Thus, the properties (degree of desulfurization (HDS) (%), desulfurization reaction rate constant (Ks), desulfurization specific activity (%), and degree of demetallization (HDM)) of the oil were determined. The results are shown in Table 3.

[1] Degree of desulfurization (HDS) (%): The proportion of sulfur content which has disappeared from the feedstock oil through conversion of sulfur content in the feedstock into hydrogen sulfide by desulfurization reaction is defined as the degree of desulfurization. The degree of desulfurization was calculated from the analytical values of sulfur content for the feedstock oil and product oil using Equation (1) below.

[2] Desulfurization reaction rate constant (Ks): The constant of a reaction rate equation which gives a second order reaction with respect to a decrease in sulfur content of the product oil (Sp) is defined as the desulfurization reaction rate constant (Ks). The desulfurization reaction rate constant was calculated by Equation (2) below. Also, the higher the reaction rate constant is, the more excellent the catalytic activity is.

[3] Desulfurization specific activity (%): The desulfurization specific activity is expressed as a relative value when the desulfurization reaction rate constant of Catalyst A is 100. The desulfurization specific activity was calculated by Equation (3) below.

[4] Degree of demetallization (HDM) (%): The proportion of metal content (total amount of nickel and vanadium) which has disappeared from the feedstock oil is defined as the degree of demetallization and the degree of desulfurization was calculated from the analytical values of metal content for the feedstock oil and product oil using Equation (4) below.

$$\text{Degree of desulfurization (\%)} = [(Sf - Sp)/Sf] \times 100 \quad (1)$$

$$\text{Desulfurization reaction rate constant} = [1/Sp - 1/Sf] \times (LHSV) \quad (2)$$

In the formulae, Sf: sulfur content in feedstock oil (% by mass),
Sp: sulfur content in product oil (% by mass), and
LHSV: liquid space velocity (h$^{-1}$).

$$\text{Desulfurization specific activity (\%)} = (\text{desulfurization reaction rate constant of each catalyst/desulfurization reaction rate constant of Catalyst A}) \times 100 \quad (3)$$

$$\text{Degree of demetallization (\%)} = [(Mf - Mp)/Mf] \times 100 \quad (4)$$

In the formulae, Mf: total amount of nickel and vanadium in feedstock oil (ppm by mass), and
Mp: total amount of nickel and vanadium in product oil (ppm by mass).

[Analysis on Product Oil]

The results of the desulfurization specific activity, degree of demetallization, resin content, asphaltene content, ratio of asphaltene content to resin content (mass ratio, [asphaltene content (% by mass)/[resin content (% by mass)]), and potential total sediment content obtained from a product oil produced from the hydrogenation reaction on the 25th operation day are shown in Table 3.

TABLE 3

| | Example | | Comparative Example 1 | Comparative Example 2 |
| --- | --- | --- | --- | --- |
| | Example 1 | Example 2 | | |
| Type of catalyst | Catalyst A | Catalyst B | Catalyst a | Catalyst b |
| Desulfurization activity (Catalyst A = 100) | 100 | 101 | 98 | 97 |
| Degree of demetallization (%) | 74 | 74 | 76 | 75 |
| Resin content (% by mass) | 3.7 | 3.8 | 3.2 | 3.3 |
| Asphaltene content (% by mass) | 2.1 | 2.1 | 2.0 | 2.1 |
| Asphaltene content/resin content (mass ratio) | 0.57 | 0.55 | 0.63 | 0.64 |
| Potential total sediment (% by mass) | 0.5 | 0.6 | 1.0 | 1.1 |

The result was that in all the catalysts, the desulfurization specific activity and the degree of demetallization were almost the same. On the other hand, regarding the resin content and the amount of potential total sediment in the product oil, in the case of using Catalyst A or Catalyst B, the resin content was large and the amount of potential total sediment was clearly small compared to the case of using Catalyst a or Catalyst b. That is, in a product oil obtained using Catalyst A or Catalyst B, a lower amount of sediment was formed and the storage stability was excellent compared to a product oil obtained using Catalyst a or Catalyst b. From these results, it was found that by using the hydroprocessing catalyst using silica having a content in a specific range which was contained in the phosphorus-silica-containing alumina carrier, without reducing the desulfurization activity of the hydroprocessing catalyst, the potential total sediment content in the hydroprocessed heavy hydrocarbon oil can be reduced and the storage stability can be enhanced.

[Production Example 1] (Preparation of Catalyst D (Front Stage Catalyst))

Zinc oxide having an average particle diameter of 7.1 μm was added to AN alumina gel so that the zinc oxide content became 8% by mass based on the carrier (that is, the zinc (Zn) content was 8% by mass in terms of oxide based on the carrier), the water content was adjusted and then the mixture was kneaded, molded, dried and calcined. Thus, a zinc oxide-containing alumina carrier was prepared. In the zinc oxide-containing alumina carrier, the zinc oxide content was 8.0% by mass based on the carrier.

On the other hand, molybdenum trioxide and nickel carbonate were added to ion-exchanged water so that the molybdenum (Mo) content became 9% by mass in terms of oxide based on the catalyst and the nickel (Ni) content became 2% by mass in terms of oxide based on the catalyst, and citric acid was added until the metal compounds further added was completely dissolved. Thus, an aqueous solution of the metal compounds was prepared. The aqueous solution was added dropwise to the zinc oxide-containing alumina carrier and the mixture was left to stand. Then, the resultant was dried and calcined. Thus, Catalyst D was obtained.

Catalyst D contained 9.1% by mass of Mo in term of oxide based on the catalyst and 2.0% by mass of Ni in term of oxide based on the catalyst, and the pore volume was 0.72 mL/g, the specific surface area was 131 m$^2$/g, the average pore diameter was 20.6 nm, and a ratio of the total volume of pores having a diameter in a range of ±2.0 nm from the average pore diameter to the total pore volume was 24%.

[Production Example 2] (Preparation of Catalyst E (Middle Stage Catalyst))

10 kg of a 5% by mass aqueous sodium aluminate solution was heated to 60° C., and while the temperature was maintained, a 25% by mass aqueous aluminum sulfate solution was added dropwise thereto so as to adjust the pH of a final solution to be to 4. The alumina slurry thus formed was filtered, the pH of the alumina gel separated out by filtration was adjusted to 7 by adding a 0.2% by mass aqueous ammonia solution to the alumina gel, and thus Alumina gel (A) in which an alumina carrier had an average particle diameter of 6 nm after calcination was obtained.

Separately, 10 kg of a 5% by mass aqueous sodium aluminate solution was heated to 70° C. and while the temperature was maintained, a 25% by mass aqueous aluminum sulfate solution was added dropwise thereto so as to adjust the pH of a final solution to be to 8. The alumina slurry thus formed was filtered, the pH of the alumina gel separated out by filtration was adjusted to 7 by adding an aqueous nitric acid solution to the alumina gel, and thus Alumina gel (B) in which an alumina carrier had an average particle diameter of 12 nm after calcination was obtained.

Silica was mixed with a mixture obtained by mixing Alumina gels (A) and (B) at a mass ratio of 1:2 so that the silica content became 0.2% by mass based on the carrier. The water content was adjusted by suction filtration at 25° C. so that the water content became 70% by mass after dewatering and drying. The silica-containing alumina gel after the water content adjustment was extruded using an extruding molding machine so as to have a four-leaf shape having a contact diameter of 1.3 mm and the molded gel was dried at 120° C. for 20 hours. Then, the resultant was calcined at 550° C. for 3 hours. Thus, a silica-containing porous alumina carrier was obtained. In the silica-containing porous alumina carrier, the silica content was 0.2% by mass based on the carrier.

Active metal components shown below were supported on 100 g of the silica-containing porous alumina carrier. That is, an aqueous solution obtained by dissolving 26.0 g of ammonium molybdate, 6.33 g of nickel carbonate, and 4.9 g of phosphate in 79.6 g of ion-exchanged water in an eggplant-shaped flask at room temperature was used as a solution for impregnation. The total amount of the solution for impregnation was added dropwise to the silica-containing porous alumina carrier in an eggplant-shaped flask and then the mixture was left to stand at 25° C. for 1 hour. Thereafter, the silica-containing porous alumina carrier was air-dried and calcined in a muffle furnace at 550° C. for 3 hours under an air stream. Thus, Hydrogenation treatment catalyst A was prepared.

Regarding the amounts of the active metals of Hydroprocessing catalyst E, the amount of Mo was 15% by mass and the amount of Ni was 3% by mass in terms of oxides based on the catalyst. The phosphorus content was 2.8% by mass in terms of oxide based on the catalyst. In the Hydroprocessing catalyst E, the specific surface area was 244 m$^2$/g, the total pore volume was 0.65 mL/g, a ratio of the total volume of pores having a pore diameter of 5 nm to 10 nm to the total volume of pores having a pore diameter of 3 nm to 30 nm was 35%, a ratio of the total volume of pores having a pore diameter of 10 nm to 15 nm to the total volume of pores having a pore diameter of 3 nm to 30 nm was 60%, a ratio of the total volume of pores having a pore diameter of 30 nm or more to the total pore volume was 2.4%, the average pore diameter of pores having a pore diameter of 10 nm to 30 nm was 11.2 nm, and a ratio of the total volume of pores having a pore diameter in a range of ±1 nm from the average pore diameter of pores having a pore diameter of 10 nm to 30 nm in the total volume of pores having a pore diameter of 3 nm to 30 nm was 41%.

The physical properties and the chemical properties of Catalyst D and Catalyst E were measured in the same manner as those of Catalyst A.

[Example 4] (Hydrogenation Reaction of Heavy Hydrocarbon Oil Using Catalysts D, E and A)

Catalyst D was used as a front stage catalyst, Catalyst E was used as a middle stage catalyst, and Catalyst A was used as a rear stage catalyst. A fixed bed flow type reactor was filled with the catalysts at a volume ratio of Catalyst D: Catalyst E: Catalyst A=20:30:50 and hydroprocessing was performed using Feedstock oil 2 having the following properties under the following reaction conditions to obtain a product oil.

(Reaction Conditions 2)
Reaction temperature: 390° C.
Hydrogen partial pressure: 10.3 MPa
Liquid space velocity: 0.253 h$^{-1}$
Hydrogen/oil ratio: 876.2 m$^3$/m$^3$
(Properties of Feedstock Oil 2)
Type of oil: Vacuum distillate residual oil of Middle East type crude oil
Density (at 15° C.): 1.015 g/cm$^3$
Sulfur content: 4.20% by mass
Nickel: 53 ppm
Vanadium: 90 ppm
Asphaltene content: 7.8% by mass

[Example 5] (Hydrogenation Reaction of Heavy Hydrocarbon Oil Using Catalysts D, E, and B)

A product oil was obtained by performing hydroprocessing in the same manner as in Example 4 except that the middle stage catalyst was changed from Catalyst A to Catalyst B.

[Comparative Example 4] (Hydrogenation Reaction of Heavy Hydrocarbon Oil Using Catalysts D, E, and a)

A product oil was obtained by performing hydroprocessing in the same manner as in Example 4 except that the middle stage catalyst was changed from Catalyst A to Catalyst a.

[Comparative Example 5] (Hydrogenation Reaction of Heavy Hydrocarbon Oil Using Catalysts D, E, and b)

A product oil was obtained by performing hydroprocessing in the same manner as in Example 4 except that the middle stage catalyst was changed from Catalyst A to Catalyst b.

[Analysis on Product Oil]

The results of the desulfurization specific activity, degree of demetallization, resin content, asphaltene content, ratio of asphaltene content to resin content (mass ratio, [asphaltene content (% by mass)/[resin content (% by mass)]), and potential total sediment content obtained from each product oil produced from the hydrogenation treatment reaction on the 25th operation day are shown in Table 4.

The degree of demetallization, resin content, asphaltene content, ratio of asphaltene content to resin content (mass ratio, [asphaltene content (% by mass)/[resin content (% by mass)]), and potential total sediment content were obtained in the same manner as described above.

The demetallization activity was expressed as a relative value when the desulfurization reaction rate constant of the product oil obtained in Example 4 was 100.

TABLE 4

|  | Example | | Comparative Example 4 | Comparative Example 5 |
|---|---|---|---|---|
|  | Example 4 | Example 5 | | |
| Type of catalyst | Catalysts D/E/A | Catalysts D/E/B | Catalysts D/E/a | Catalysts D/E/b |
| Desulfurization specific activity (Example 4 = 100) | 100 | 101 | 99 | 98 |
| Degree of demetallization (%) | 81 | 81 | 82 | 81 |
| Resin content (% by mass) | 4.3 | 4.4 | 3.7 | 3.6 |
| Asphaltene content (% by mass) | 2.0 | 2.2 | 2.3 | 2.2 |
| Asphaltene content/ Resin content (mass ratio) | 0.47 | 0.5 | 0.62 | 0.58 |
| Potential total sediment (% by mass) | 0.5 | 0.6 | 1.1 | 1.0 |

The result was that in any combination of the catalysts, desulfurization activity and demetallization activity were almost the same. On the other hand, regarding the resin content and the amount of potential total sediment in the product oils, in the cases of Examples 4 and 5 using Catalysts A and B as the rear stage catalyst, the resin content was large and the amount of potential total sediment was remarkably small compared the cases of Comparative Examples 4 and 5 using Catalyst a and b. That is, in the case of the product oil obtained by using Catalyst A or Catalyst B as the rear stage catalyst, sediment was not easily produced and storage stability was excellent.

INDUSTRIAL APPLICABILITY

The hydroprocessing catalyst according to the present invention has excellent desulfurization activity to heavy hydrocarbon oil.

Further, a heavy hydrocarbon oil which does not easily produce sediment and has excellent storage stability can be obtained by performing hydroprocessing using the hydroprocessing catalyst.

The invention claimed is:

1. A hydroprocessing catalyst for heavy hydrocarbon oil using, as a carrier, phosphorus-silica-containing alumina that contains 0.1% by mass to 4% by mass of phosphorus in terms of oxide based on the carrier and 0.1% by mass to 1.5% by mass of silica based on the carrier, and supporting, on the carrier, 8% by mass to 20% by mass of at least one selected from metals in Group 6 of the periodic table in terms of oxide based on the catalyst and 2% by mass to 6% by mass of at least one selected from metals in Groups 8 to 10 of the periodic table in terms of oxide based on the catalyst.

2. A hydroprocessing method for heavy hydrocarbon oil, comprising:

performing hydroprocessing by sequentially bringing heavy hydrocarbon oil into contact with a front stage catalyst, a middle stage catalyst, and a rear stage catalyst at a hydrogen partial pressure of 3 MPa to 20 MPa, a hydrogen/oil ratio of 400 $m^3/m^3$ to 3,000 $m^3/m^3$, a temperature of 300° C. to 420° C., and a liquid space velocity of 0.1 $h^{-1}$ to 3 $h^{-1}$, wherein (a) as the front stage catalyst, in which an inorganic oxide carrier containing 1% by mass to 15% by mass of zinc oxide based on the carrier contains 2% by mass to 15% by mass of at least one selected from metals in Group 6 of the periodic table and 0.001% by mass to 5% by mass of at least one selected from metals in Groups 8 to 10 of the periodic table in terms of oxides based on the catalyst, and the specific surface area is 70 $m^2/g$ to 150 $m^2/g$, the pore volume is 0.6 mL/g to 1 mL/g, the average pore diameter is 15 nm to 35 nm, and a ratio of the total volume of pores having a pore diameter in a range of ±2.0 nm from the average pore diameter to the total pore volume is 15% to 50%, is used in an amount of 10% by volume to 50% by volume with respect to the entire catalyst, (b) as the middle stage catalyst, a hydroprocessing catalyst, in which a hydrogenation-active component is supported on a silica-containing porous alumina carrier containing 0.1% by mass to 1.5% by mass of silica based on the carrier, the total pore volume is 0.55 mL/g to 0.75 mL/g, and the following conditions (1) to (5) relating to a pore distribution are satisfied:

(1) the total volume of pores having a pore diameter of 5 nm to 10 nm is 30% to 45% of the total volume of pores having a pore diameter of 3 nm to 30 nm;

(2) the total volume of pores having a pore diameter of 10 nm to 15 nm is 50% to 65% of the total volume of pores having a pore diameter of 3 nm to 30 nm;

(3) the total volume of pores having a pore diameter of 30 nm or more is 3% or less of the total pore volume;

(4) the average pore diameter of pores having a pore diameter of 10 nm to 30 nm is 10.5 nm to 13 nm; and (5) the total volume of pores having a pore diameter in a range of ±1 nm from the average pore diameter is 25% or more of the total pore volume of pores having a pore diameter of 3 nm to 30 nm, is used in an amount of 10% by volume to 50% by volume with respect to the entire catalyst, and (c) as the rear stage catalyst, the hydroprocessing catalyst according to claim 1 is used in an amount of 20% by volume to 70% by volume with respect to the entire catalyst.

3. The hydroprocessing catalyst for heavy hydrocarbon oil according to claim 1, wherein the specific surface area of the hydroprocessing catalyst is 200 m$^2$/g to 300 m$^2$/g.

4. The hydroprocessing catalyst for heavy hydrocarbon oil according to claim 1, wherein the average pore diameter of the hydroprocessing catalyst is 7 nm to 13 nm.

5. A method for manufacturing a hydroprocessing catalyst for heavy hydrocarbon oil, comprising:
a step of preparing an alumina gel;
a step of kneading the alumina gel with a phosphorous compound and silica such that 0.1% by mass to 4% by mass of phosphorus in terms of oxide based on a carrier, and 0.1% by mass to 1.5% by mass of silica based on a carrier is incorporated to obtain a kneaded mixture;
a step of obtaining a phosphorus-silica-containing alumina carrier by molding the obtained kneaded mixture to obtain a molded product, and drying and calcining the molded product; and
a step of supporting, on the phosphorus-silica-containing alumina carrier, at least one selected from metals in Group 6 of the periodic table and at least one selected from metals in Groups 8 to 10 of the periodic table such that 8% by mass to 20% by mass of at least one selected from metals in Group 6 of the periodic table in terms of oxide based on a catalyst and 2% by mass to 6% by mass of at least one selected from metals in Groups 8 to 10 of the periodic table in terms of oxide based on a catalyst are incorporated.

6. A hydroprocessing method for heavy hydrocarbon oil, comprising:
performing hydroprocessing by sequentially bringing heavy hydrocarbon oil into contact with a front stage catalyst, a middle stage catalyst, and a rear stage catalyst at a hydrogen partial pressure of 3 MPa to 20 MPa, a hydrogen/oil ratio of 400 m$^3$/m$^3$ to 3,000 m$^3$/m$^3$, a temperature of 300° C. to 420° C., and a liquid space velocity of 0.1 h$^{-1}$ to 3 h$^{-1}$,
wherein (a) as the front stage catalyst, in which an inorganic oxide carrier containing 1% by mass to 15% by mass of zinc oxide based on the carrier contains 2% by mass to 15% by mass of at least one selected from metals in Group 6 of the periodic table and 0.001% by mass to 5% by mass of at least one selected from metals in Groups 8 to 10 of the periodic table in terms of oxides based on the catalyst, and the specific surface area is 70 m$^2$/g to 150 m$^2$/g, the pore volume is 0.6 mL/g to 1 mL/g, the average pore diameter is 15 nm to 35 nm, and a ratio of the total volume of pores having a pore diameter in a range of ±2.0 nm from the average pore diameter to the total pore volume is 15% to 50%, is used in an amount of 10% by volume to 50% by volume with respect to the entire catalyst, (b) as the middle stage catalyst, a hydroprocessing catalyst, in which a hydrogenation-active component is supported on a silica-containing porous alumina carrier containing 0.1% by mass to 1.5% by mass of silica based on the carrier, the total pore volume is 0.55 mL/g to 0.75 mL/g, and the following conditions (1) to (5) relating to a pore distribution are satisfied:

(1) the total volume of pores having a pore diameter of 5 nm to 10 nm is 30% to 45% of the total volume of pores having a pore diameter of 3 nm to 30 nm;

(2) the total volume of pores having a pore diameter of 10 nm to 15 nm is 50% to 65% of the total volume of pores having a pore diameter of 3 nm to 30 nm;

(3) the total volume of pores having a pore diameter of 30 nm or more is 3% or less of the total pore volume;

(4) the average pore diameter of pores having a pore diameter of 10 nm to 30 nm is 10.5 nm to 13 nm; and (5) the total volume of pores having a pore diameter in a range of ±1 nm from the average pore diameter is 25% or more of the total pore volume of pores having a pore diameter of 3 nm to 30 nm, is used in an amount of 10% by volume to 50% by volume with respect to the entire catalyst, and (c) as the rear stage catalyst, a hydroprocessing catalyst manufactured by the method according to claim 2 is used in an amount of 20% by volume to 70% by volume with respect to the entire catalyst.

* * * * *